United States Patent [19]

Reichert

[11] 4,055,943
[45] Nov. 1, 1977

[54] BOTTLE LOADING MACHINE
[75] Inventor: Donald G. Reichert, Tarpon Springs, Fla.
[73] Assignee: ABC Packaging Machine Corporation, Tarpon Springs, Fla.
[21] Appl. No.: 694,205
[22] Filed: June 9, 1976
[51] Int. Cl.² .................................... B65B 21/18
[52] U.S. Cl. ............................ 53/247; 53/166; 294/116
[58] Field of Search ............... 53/247, 166; 294/116, 294/87 R

[56] References Cited
U.S. PATENT DOCUMENTS

| 2,921,425 | 1/1960 | Seval | 53/247 |
| 2,978,854 | 4/1961 | Fairest | 53/247 X |
| 3,864,890 | 2/1975 | Ullman | 53/247 X |
| 3,944,058 | 3/1976 | Strauss | 294/116 X |

Primary Examiner—Travis S. McGehee
Attorney, Agent, or Firm—Newton, Hopkins & Ormsby

[57] ABSTRACT

A machine for loading bottles into cases having a bottle conveyor for continuously conveying upstanding bottles through a bottle retriever station, and a bottle grouper for grouping together into a preselected arrangement a plurality of upstanding bottles on the conveyor. A case conveyor is provided for continually conveying open cases through a case loading station. A bottle gripper is also provided for gripping and carrying a grouped plurality of upstanding bottles as they move through the bottle retrieving station off of the bottle conveyor, and for subsequently depositing the group of bottles into an open case as it passes through the case loading station upon the case conveyor. The gripper itself includes a finger suspension member and a plurality of bottle gripping fingers pivotably suspended from the finger suspension member about an open space for mutually convergent and divergent movement towards and away from the open space, respectively. The mechanism also includes a finger locking sleeve mounted about the finger suspension member and the bottle gripping fingers and an actuator for imparting relative movement between the finger suspension member and the finger locking sleeve to effect the mutually convergent and divergent movements.

20 Claims, 9 Drawing Figures

BOTTLE LOADING MACHINE

BACKGROUND OF THE INVENTION

This invention relates generally to machines for loading bottles into cases.

Heretofore, as exemplified by that disclosed in U.S. Pat. No. 2,712,405, machines have been devised for automatically loading bottles into cases. These machines, however, have proven less than satisfactory in actual operation. For example, they have typically employed a conveyor for conveying bottles to a bottle retrieving station and another conveyor for conveying open cases into a case loading station. Either or both of these conveyors have moved into intermittent motion in order to group the bottles together, grip them at a bottle retrieving station, and load them into cases at a case loading station. This stop and go movement results in slow rates of case packing speeds, and also reduces the reliability and longivity of many machine parts. The gripping means employed in these machines have also failed to function properly in gripping without breaking grouped sets of bottles. Misalignment of any one bottle typically causes it to break or to produce less than a full complement of bottles within the case. The mechanisms employed by the machines in grouping the bottles have typically employed a number of independent conveyor belts moved at successively increasing speeds in order to effect accumulation. This has resulted in the requirement for yet additional conveyor belts and transmission means for driving them at mutually diverse speeds. At the case loading station the means for loading the groups of bottles into the cases have also been less than satisfactory in that their structures have often come into contact with the sides of the cases causing them to be bent or crushed during loading and bottles broken as they are passed through their open tops.

Accordingly, it is a general object of the present invention to provide an improved machine and a method for loading bottles into cases.

More specifically, it is an object of the present invention to provide a bottle loading machine having improved means for accumulating individual bottles at a bottle accumulation station into a group.

Another object of the invention is to provide a case loading machine with improved means for gripping and lifting a group of insulating bottles from a moving conveyor at a bottle retrieving station.

Another object of the invention is to provide a case loading machine capable of loading bottles into cases being moved along a conveyor at a uniform velocity.

Yet another object of the invention is to provide a case loading machine into improved means for lowering a group of bottles into an open case without misalignment which may produce a crushing of the case sides or breaking of the bottles as they are inserted into the case.

SUMMARY OF THE INVENTION

In one form of the invention a machine is provided for loading bottles into cases comprising bottle conveying means for continuously conveying upstanding bottles through a bottle retrieving station, bottle grouping means for grouping together into a preselected arrangement a plurality of upstanding bottles on the bottle conveyor means, case conveyor means for continually conveying open cases through a case loading station, and bottle gripper means for gripping and carrying a grouped plurality of upstanding bottles as they move through the bottle retrieving station off of the bottle conveyor means and for subsequently depositing the gripped group of bottles into an open case as it passes through the case loading station upon the case conveyor means.

In another form of the invention a machine is provided for loading bottles into open cases comprising an endless conveyor belt and means for driving the endless conveyor belt through a bottle grouping station, and a bottle retrieving station at a uniform rate of speed. Another endless conveyor belt is provided and means for driving it through a case loading station at a uniform rate of speed. Means are provided for grouping together into a preselected arrangement a plurality of upstanding bottles on the endless conveyor belt at the bottle grouping station, gripper means for gripping and carrying a grouped plurality of upstanding bottles at the bottle retrieving station off of the endless conveyor belt, and means for moving the gripped bottles from the bottle retrieving station to the case loading station. Means are also provided for passing open topped cases on the other endless conveyor belt through the case loading station, and means for lowering the gripped plurality of bottles into the open topped cases as they move through the case loading station.

In yet another form of the invention a mechanism is provided in a bottle loading machine for lifting an assembly of free standing bottles from a moving conveyor comprising a finger suspension member, a plurality of bottle gripping fingers pivotably suspended from the finger suspension member about an open space for mutually convergent and divergent movement towards and away from the open space respectively, a finger locking sleeve mounted about at least a portion of the finger suspension member and the plurality of bottle gripping fingers, and means for imparting relative movement between the finger suspension member and the finger locking sleeve to effect mutually convergent and divergent movements.

DETAILED DESCRIPTION OF THE DRAWING

Figure 1:
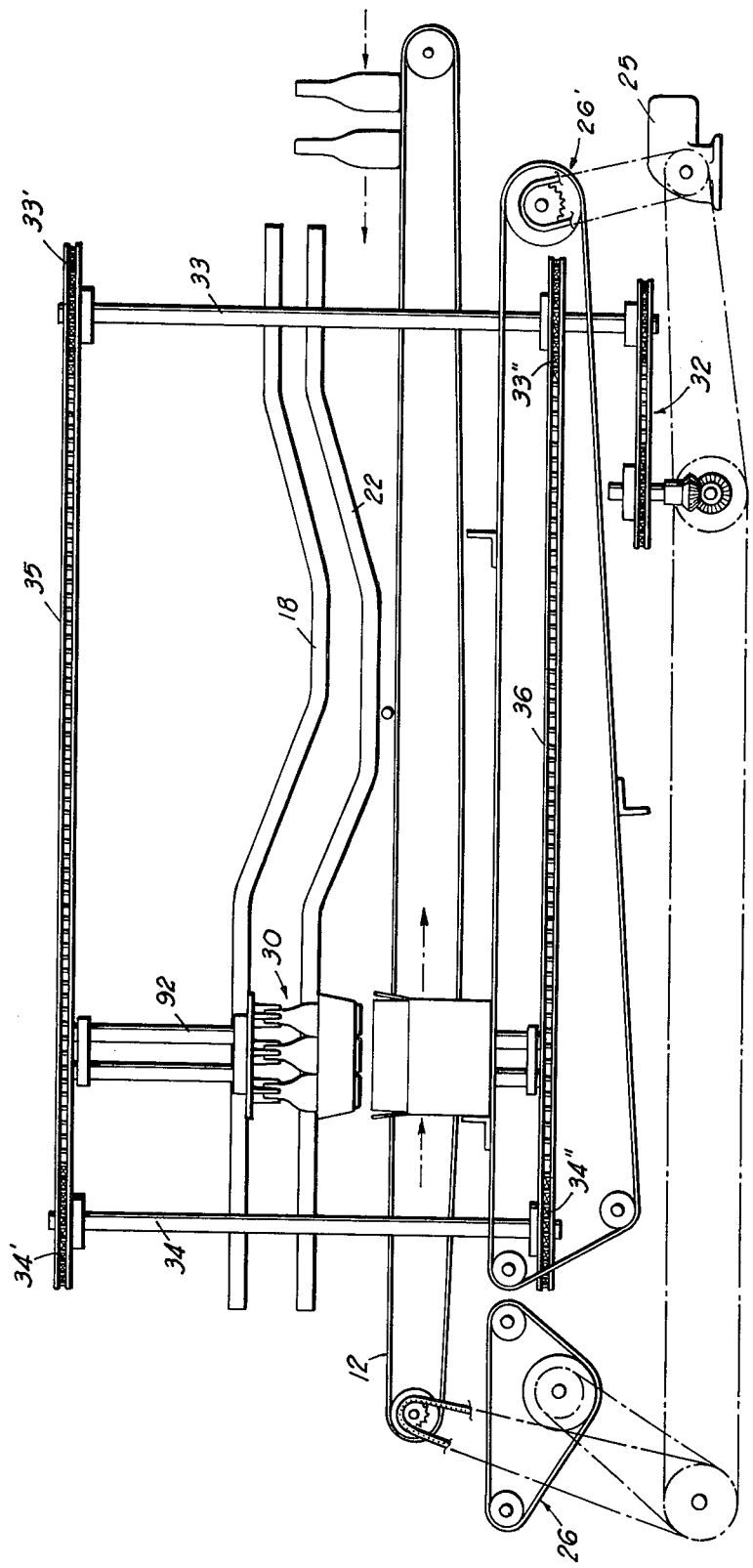
FIG. 1 is a schematic see-through side view of a bottle loading machine of the present invention.

Referring now in more detail to the drawing, there is shown a bottle loading machine comprising a frame 10 upon which are movably mounted the laterally spaced parallel, a first endless conveyor belt 12 and second endless conveyor belt 14. If desired, a single, unitary belt may be substituted for these two belts. A case input conveyor belt 16 is shown sequentially mounted in advance of belt 14. An upper guide rail 18 encircles a central housing 20 as does a lower guide rail 22 mounted beneath the upper guide rail. Both the conveyor belts 12 and 14 are driven at a constant, uniform rate of speed by an electric motor 25 through transmission means designated generally at 26 and 26'.

With continued reference to FIGS. 1–4, the machine is seen further to have four bottle gripping and carrying mechanisms 30 mounted for circuituous movement in an oval path along rails 18 and 22 consecutively and respectively above the two conveyor belts. These bottle gripping and carrying mechanisms are themselves driven at a constant speed in a horizontal direction by the electric motor 25 through a drive transmission means 32 that includes two vertical drive shafts 33 and 34 which support upper sprockets 33' and 34' and lower sprockets 33" and 34" about which an upper drive chain 35 and a lower drive chain 36 are respectively mounted for revolution about generally horizontal, vertically spaced orbits. The four bottle gripper and carrying mechanism 30 are driven by these two drive chains as shown most clearly in FIG. 1. The drive chains 35 and 36 travel in oval paths as shown for chain 35 in FIG. 4, the chains 35 and 36 having parallel flights which are respectively inwardly adjacent to the conveyor belts 12 and 14.

Figure 3:
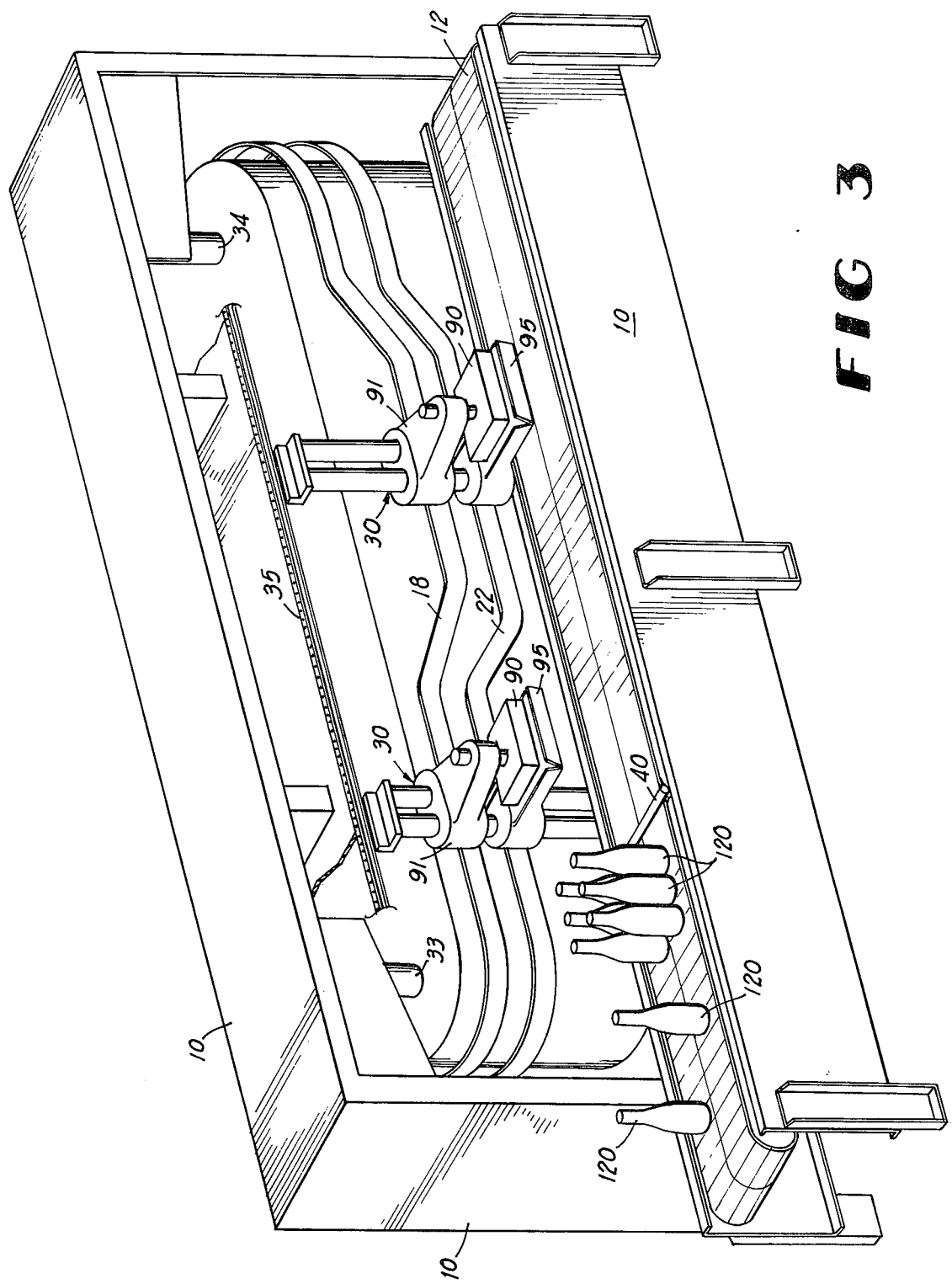
FIG. 3 is a perspective view in more detail of the machine shown in FIG. 1 of the side opposite to that shown in FIG. 2 in which a bottle accumulation station and a bottle retrieving station are located.
Figure 5:
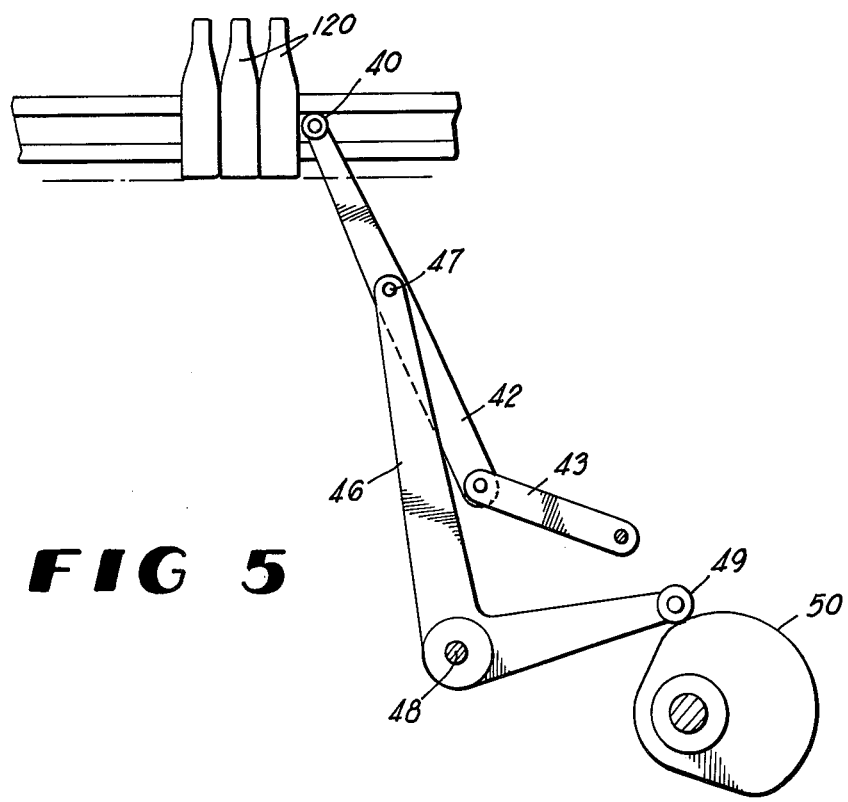
FIG. 5 is a side elevational view of the bottle grouping mechanism employed in the machine shown in FIGS. 1-4.

With reference next to FIGS. 3 and 5, the machine is seen to include a mechanism for assembling a group of six bottles in a pre-selected arrangement prior to becoming gripped and carried from the conveyor belt by the gripping and carrying mechanisms 30. The bottle accumulation device includes a rod 40 overlaying the conveyor belt 12 which rod is mounted to a pair of mutually coupled links 42 and 43 to a fixed pivot pin 45. A bell crank 46 is pivotably connected by pin 47 to link 42. The bell crank has a fixed pivot pin 48 and a cam follower 49 disposed in rotatable engagement with a cam 50. So constructed, rotation of cam 50 causes the bell crank and linkage to reciprocate rod 40 in a substantially horizontal plane over the conveyor belt 12. Reciprocation of the rod with bottles being sequentially fed thereto thus causes the bottles to periodically become grouped as depicted in FIG. 3.

Figure 7:
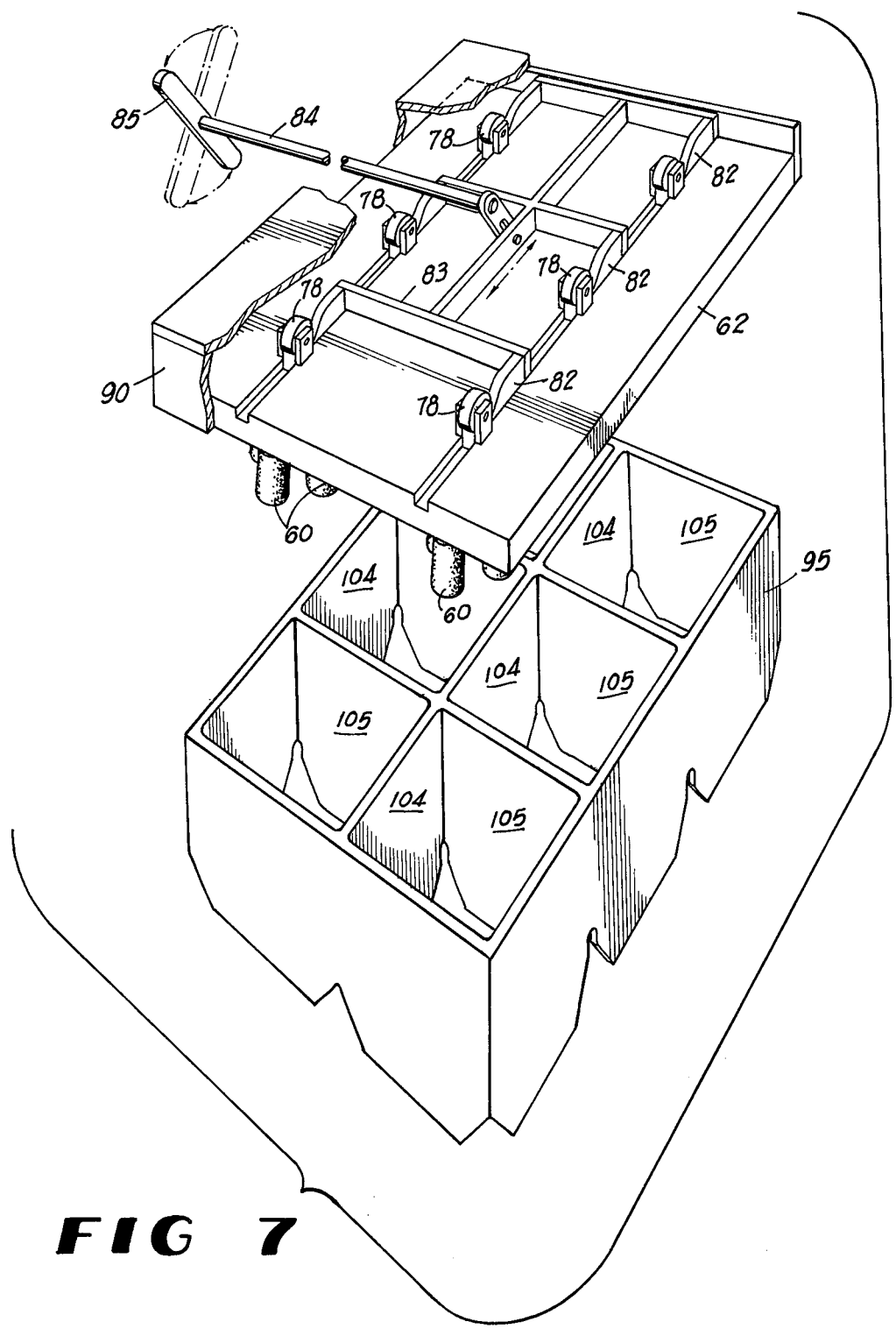
FIG. 7 is a perspective view of the bottle gripping mechanism employed in the machine of FIGS. 1-4.
Figure 8:
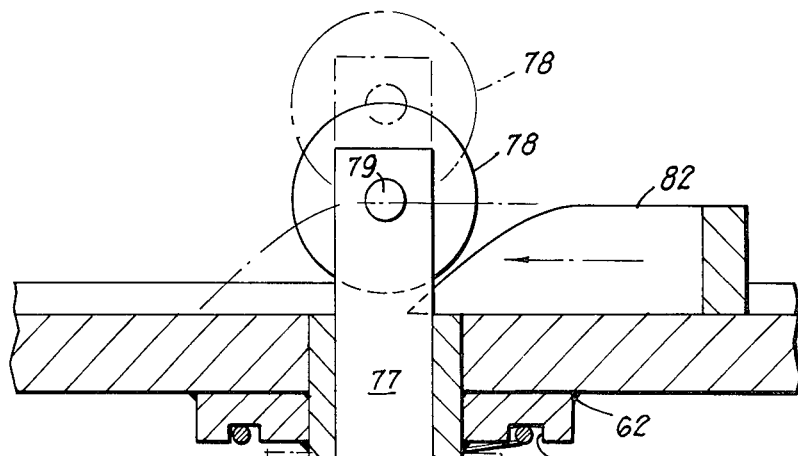
FIG. 8 is a cross-sectional view of a portion of the bottle gripping mechanism depicted in FIG. 7.
Figure 9:
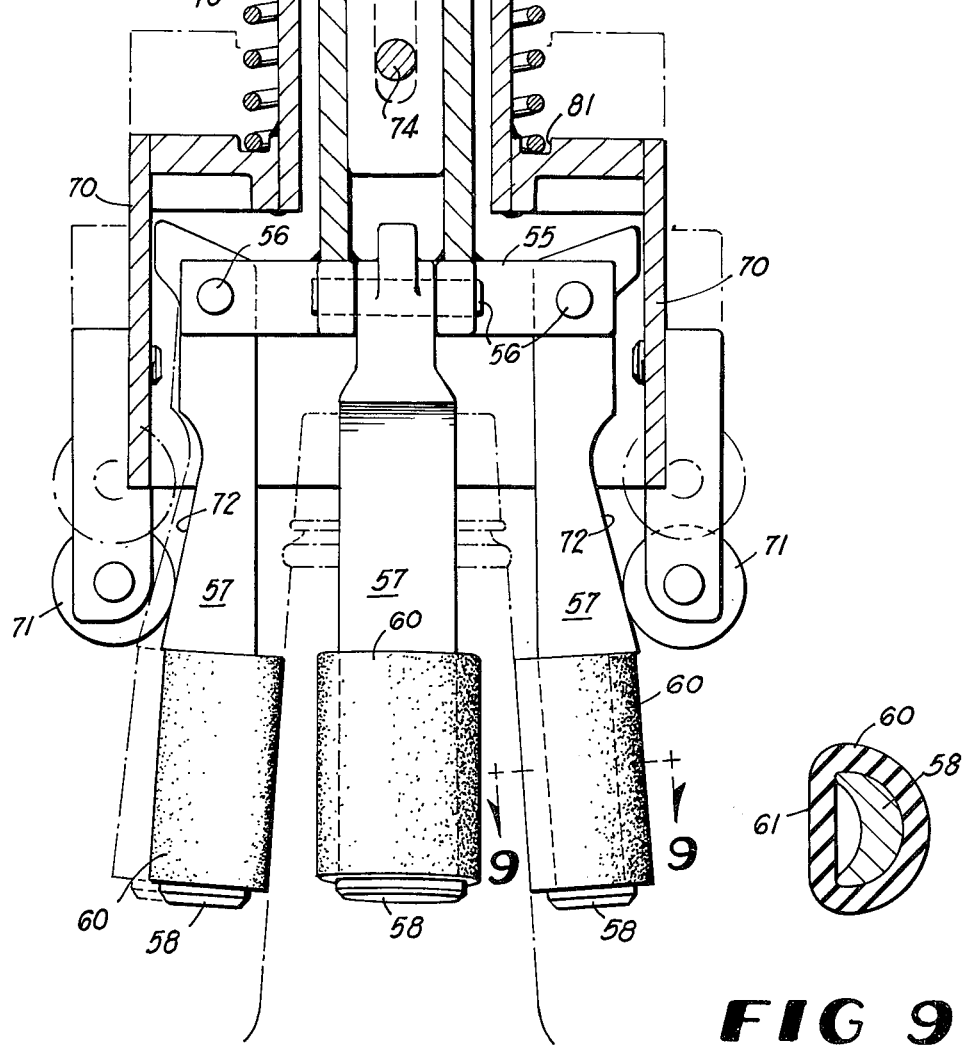
FIG. 9 is a cross-sectional view of a finger component of the mechanism shown in FIG. 8 taken along plane 9—9.

With reference next to FIGS. 8 and 9, the bottle gripping and carrying mechanism is seen to include a finger suspension member 55 to which are pivotably mounted by pivot pins 56 four bottle gripping fingers 57. The lower end of the fingers are crescent-shaped as shown in FIG. 9 and are encapsulated in a pad of resilient rubber 60. These fingers are disposed about an open space adapted to receive a bottle neck as shown in broken lines in FIG. 8. They are pivotably mounted to the finger suspension member for mutual convergent and divergent movement towards and away from this open space in gripping the neck of a bottle with the substantially planar surfaces 61 of the pads in engagement with the bottle. Rigidly mounted to and extending upwardly from the finger suspension member is a tubular section 55' that depends from a suspension plate 62 shown in full in FIG. 7.

About the finger suspension member 55 and the fingers 57 is disposed a locking sleeve 70 having four locking sleeve rollers 71 mounted in rotatable engagement with a camming surface 72 on the outwardly facing upper surfaces of fingers 57. An upper tubular portion 70' of the locking sleeve is coaxially disposed about the upper portion 55' of the finger suspension member. A central pin 74 bridges the open space between opposite inside surfaces of the tubular section 55' passing through a slot 76 in an actuating rod 77 that projects upwardly and out of the top of the tubular section 55'. To the top of the actuating rod is mounted a cam roller 78 by means of a roller pin 79. A compression spring 80 is disposed between an upper surface 81 of the locking sleeve and a downwardly facing surface 82 of plate 62 thereby biasing the locking sleeve downwardly.

Figure 6:
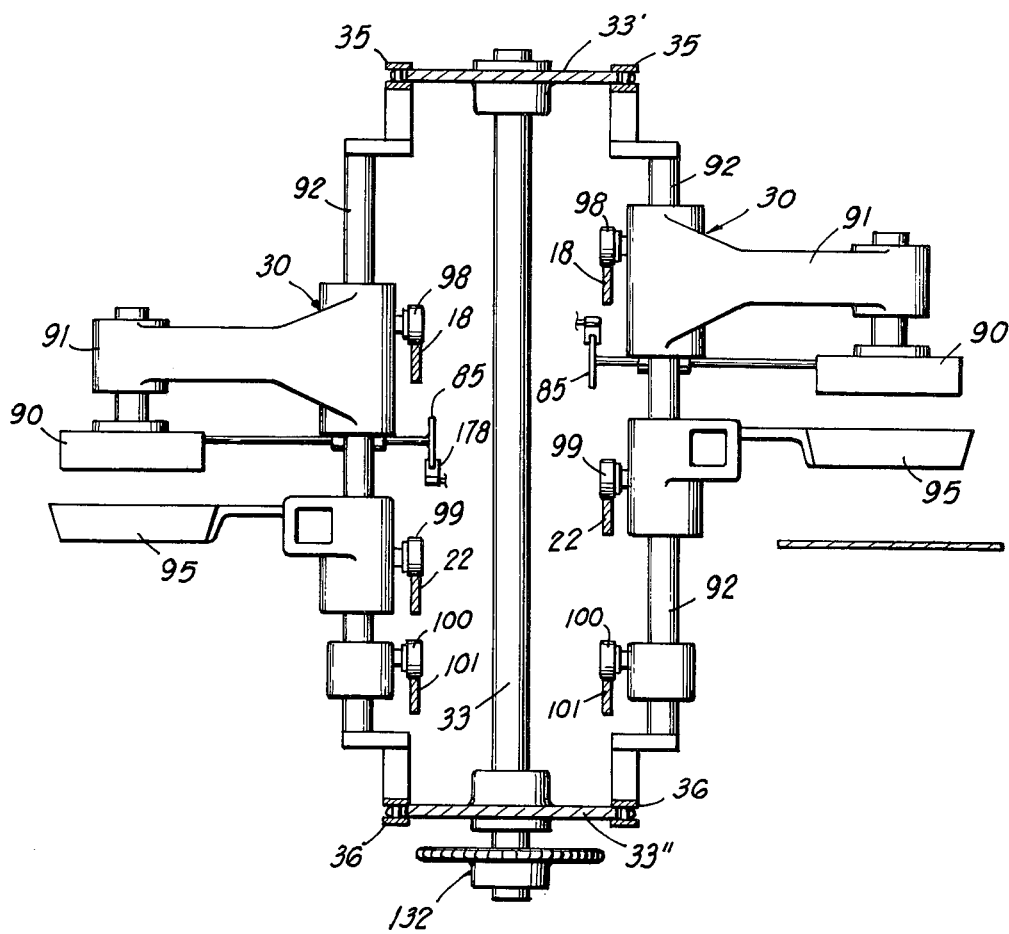
FIG. 6 is an end-on view of the machine shown in FIG. 1.

As may be visualized by reference to FIG. 7, there are six of these bottle gripping and lifting mechanisms mounted to a single plate 82 with cam rollers 78 being located closely adjacent or in actual contact with cams 82. These cams are interconnected by a frame 83 and are movable towards and away from their adjacent cam rollers by means of a rotatable rod 84 rigidly connected to a trip lever 85. The six gripping and carrying mechanisms thus are all mounted generally within a single gripper housing 90 shown in FIGS. 2 and 6, which depends from a pillar 91 coupled by vertical posts 92 to the driving chains 35 and 36.

With reference next to FIGS. 3 and 7 the bottle gripping and carrying mechanism are seen further to include a cellular collar 95 having six tubular, vertical passageways therethrough sized to receive a group of six bottles. The interior cellular structure of the collar is provided by a longitudinal center wall 104 and to parallel lateral walls 105. Each collar is mounted below the bottle gripper mechanism housing 90 to the vertical posts 92. The relative vertical spacing between each vertically aligned collar and gripper housing, however, is subject to spacial variations due to differences in the elevations of rails 18 and 22 as they extend about the central machine housing 20. While the elevation of the gripper housing is determined at any one point by its location along rail 18, that of the collar is determined by its position along rail 22. In FIG. 6, for example, the gripper housings 90 are seen to be vertically located by the positions of roller 98 upon rail 18 while the vertical positions of collars 95 are seen to be determined by the position of rollers 99 upon rails 22. Posts 92 are supported by rollers 100 upon rails 101 in addition to being coupled to the drive chains 35 and 36.

Figure 2:
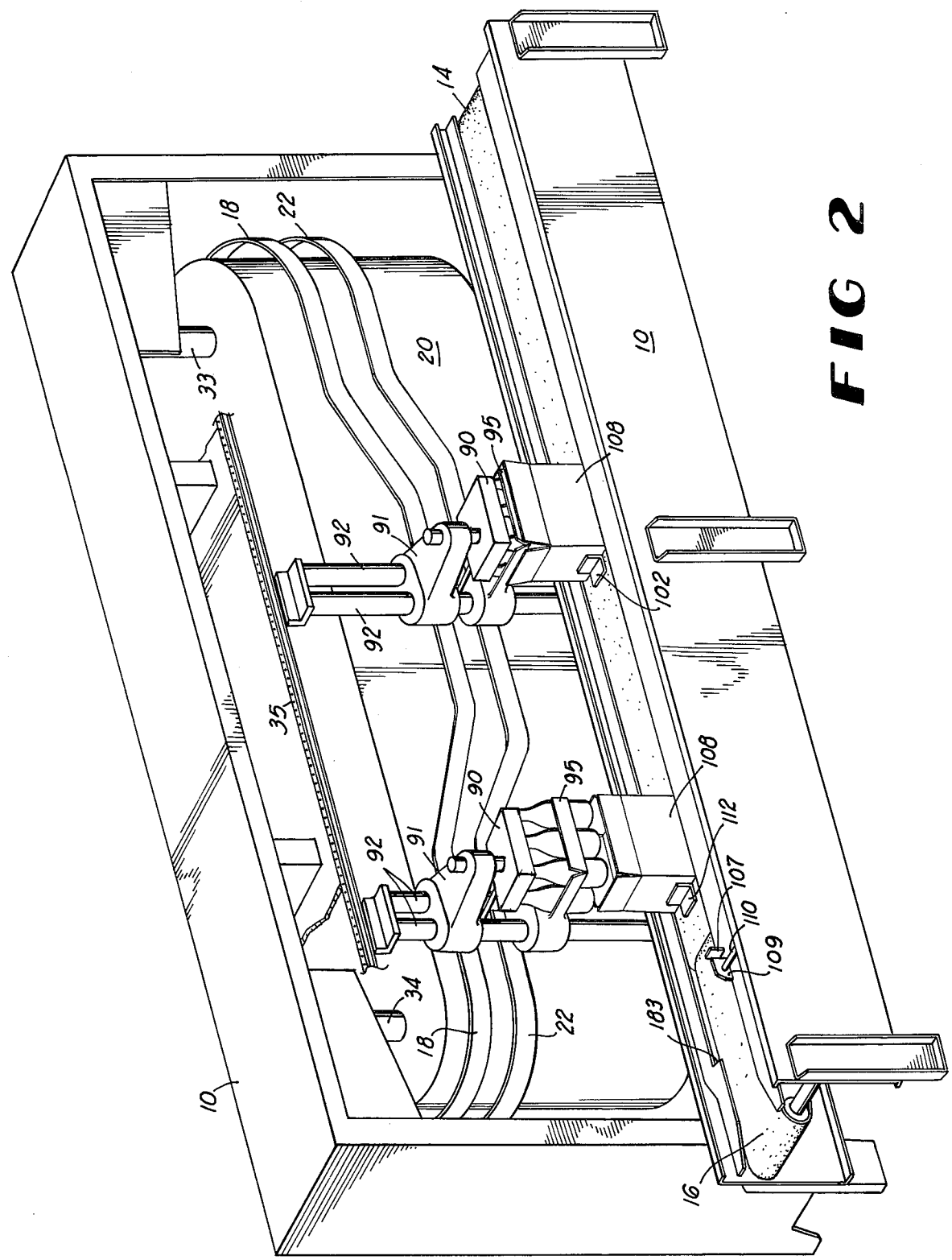
FIG. 2 is a perspective view in more detail of the side of the machine depicted in FIG. 1 in which a case loading station is located.

With reference next to FIG. 2 the case infeed conveyor 16 is seen to pass adjacent a lateral stop 107 which intercepts the path that opened topped cases 108 pass. A push plate 109 is mounted to the end of a push rod 110 adjacent the stop 107 for lateral movement over the conveyor belt 16. Atop the conveyor belt 14 is mounted a series of angle irons 112 that serve to position cases 108 situated upon the conveyor belt 14.

Figure 4:
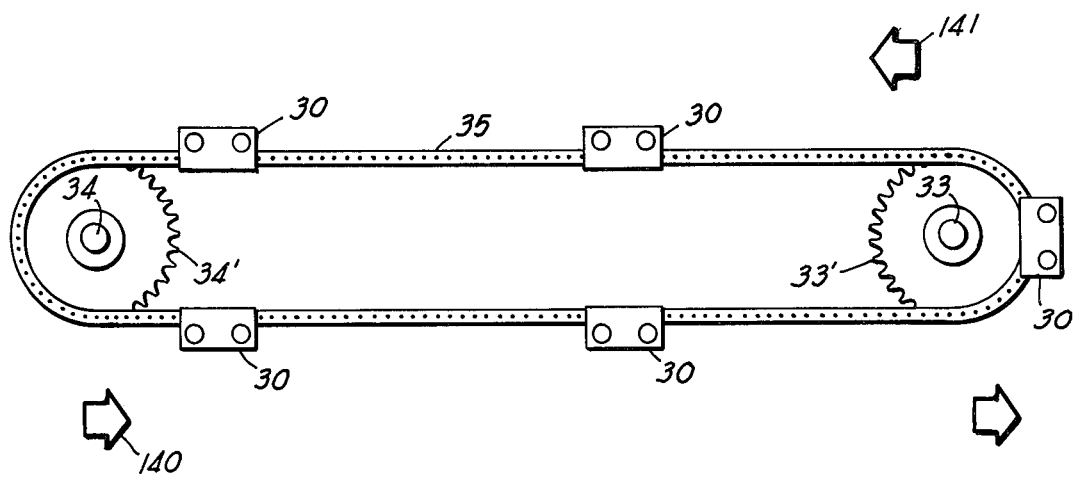
FIG. 4 is a schematic plan view of the machine shown in FIG. 1.

In general operation, bottles are introduced onto the conveyor belt in one direction as indicated by arrow 141 in FIG. 4. They are accumulated into sets of six and then lifted by the bottle gripping and carrying mechanism as it passes thereover. The mechanism then proceeds over the conveyor belt 12, around an end of the machine and then over belt 14. The gripper then deposits the bottles into an open case which has been fed into the machine in the other direction shown by arrow 140 atop belt 14. Once the bottles are deposited into the open case, the gripper mechanism continues on around the other end of the machine and back over belt 12 to receive another set of bottles and repeat its cycle of operation.

More specifically as seen in FIG. 3 bottles are fed one at a time towards the bottle grouping mechanism bar 40 which is reciprocally driven over the conveyor belt 12. This is accomplished by the mechanism previously described and illustrated in FIG. 5. Once a set of bottles is grouped together an individual bottle gripping and carrying mechanism passes down above and over the tops of the bottles bringing collar 95 over the bottles as they move along belt 12. The positioning of the cellular collar 95 causes the bottles to assume a more precise relative spacing with respect to each other for subsequent operation of the gripper fingers. In FIG. 3 it is seen that rail 22 descends slightly in advance of rail 18 thereby causing the collar to descend in advance of the gripper fingers. The fingers themselves are actuated by a cam 178 shown in FIG. 6 that directly engages the spring biased lever 82 shown in FIG. 7. This action forces cams 82 away from cam rollers 78 thereby enabling the cam rollers 78 and actuator 77 to descend from its position shown in broken lines in FIG. 8. This causes the finger locking collar 70 to move downwardly and rollers 71 to cam fingers 57 inwardly. This brings them into gripping engagement with the neck of the bottle. This action occurs simultaneously with all six sets of four fingers each disposed about the six bottles disposed within the cellular collar 95. Continued movement of the bottle gripping and lifting mechanism along rails 18 and 22 guides the mechanism upwardly thereby lifting the upstanding bottles off the conveyor belt 12 and causing them to travel on around the right hand end of the machine as viewed in FIG. 3. The presence of the collar prevents them from swinging outwardly as they round the machine end.

With reference next to FIG. 2 it will be seen that cases 108 introduced into the machine upon conveyor belt 16 are brought into abutment with stop 107. Timed operation of the pusher 109 periodically forces a case momentarily held by stop 107 to the left as viewed in this Figure into the indentation 183. From here the case is free to move on beyond stop 107 and be picked up by the next successive angle iron 108 and positively urged forward on conveyor belt 14. In timed sequences with this operation, a loaded bottle gripping and carrying mechanism comes from behind the left side of the machine as viewed in FIG. 2 and positions a group of bottles directly above the open top case 108 now continually being moved by the belt 14. Again the elevation of rails 18 and 22 is such as to cause the bottle gripper to lower the gripped set of bottles into the open topped case. As this occurs collar 95 slides into the top of the open case thereby guiding the group thereinto. Operation of lever 85 by another cam causes the fixed cams 82 to move under the cam rollers 78 thereby enabling the finger lock sleeve to rise and release fingers 57 from about the bottles. Following release of the bottles the bottle gripping and lifting mechanism is lifted and returned around the right end of the machine as viewed in FIG. 2 along rails 18 and 22 to start another cycle of operation.

It should be understood that the just described embodiment merely illustrates principles of the present invention in one preferred form. Many modifications, additions and deletions may, of course, be made thereto without departure from the spirit and scope of the invention as set foth in the following claims.

What is claimed is

1. A machine for loading bottles into cases comprising, in combination, bottle conveyor means for continuously conveying upstanding bottles through a bottom retrieving station; grouping means for grouping together into a preselected arrangement a plurality of upstanding bottles on said bottle conveyor means; case conveyor means for continually conveying open cases through a case loading station; and gripper means for gripping and carrying a grouped plurality of upstanding bottles as they move through the botle retrieving station off of said bottle conveyor means and for subsequently depositing the gripped group of bottles into an open case as it passes through the case loading station upon said case conveyor means, said grouping means comprises a bottle retainer bar overlying said bottle conveyor means, and means for reciprocally moving said retainer bar over said bottle conveyor means.

2. A bottle loading machine in accordance with claim 1 wherein said reciprocal moving means comprises a bell crank linked with said retainer bar and having a cam follower pivotably mounted in sliding contact with a drive cam.

3. A machine for loading bottles into cases comprising, in combination, bottle conveyor means for continuously conveying upstanding bottles through a bottle retrieving station; grouping means for grouping together into a preselected arrangement a plurality of upstanding bottles on said bottle conveyor means; case conveyor means for continually conveying open cases through a case loading station; and gripper means for gripping and carrying a grouped plurality of upstanding bottles as they move through the bottle retrieving station off of said bottle conveyor means and for subsequently depositing the gripped group of bottles into an open case as it passes through the case loading station upon said case conveyor means, said grouping means comprises a cellular collar and drive means for reciprocally elevating and lowering said cellular collar.

4. A machine for loading bottles into cases comprising, in combination, bottle conveyor means for continuously conveying upstanding bottles through a bottle retrieving station; grouping means for grouping together into a preselected arrangement a plurality of upstanding bottles on said bottle conveyor means; case conveyor means for continually conveying open cases through a case loading station; and gripper means for gripping and carrying a grouped plurality of upstanding bottles as they move through the bottle retrieving station off of said bottle conveyor means and for subsequently depositing the gripped group of bottles into an open case as it passes through the case loading station upon said case conveyor means, said gripper means comprises a locking sleeve, an actuating member coupled with an upper portion of said locking sleeve, spring biased means biasing said locking sleeve downwardly, and a plurality of bottle gripper fingers movably housed within said locking sleeve.

5. A bottle loading machine in accordance with claim 4 having a plurality of rollers rotatably mounted to a lower portion of said locking sleeve in rotatable engagement with said bottle gripper fingers.

6. A bottle loading machine in accordance with claim 4 wherein said gripper means further comprises a cam roller rotatably mounted to an upper portion of said actuating member, and a cam mounted for movement in driving engagement with said cam roller.

7. In a bottle loading machine a mechanism for lifting an assembly of free standing bottles comprising, in combination, a conveyor, gripper means carried by said conveyor means for imparting vertical movement to said gripper means; said gripper means including a finger suspension member, a plurality of bottle gripping fingers pivotably suspended from said finger suspension member about an open space for mutually convergent and divergent movement towards and away from the open space, respectively; a finger locking sleeve mounted about at least a portion of said finger suspension member and said plurality of bottle gripping fingers; and means for imparting relative movement between said finger suspension member and said finger locking sleeve in a generally vertical direction while said gripper means is also being moved vertically.

8. In a bottle loading machine the mechanism of claim 7 wherein said locking sleeve has a plurality of locking sleeve rollers rotatably mounted thereto in engagement with caming surfaces of said plurality of bottle gripping fingers.

9. In a bottle loading machine the mechanism of claim 7 wherein the lowermost portion of each of said bottle gripping fingers includes a crescent-shaped inner metallic member encapsulated in a resilient pad.

10. The machine for loading bottles into cases as defined in claim 7 wherein said gripping means includes a bar disposed across said bottle conveyor means and movable at a slower rate than said bottle conveyor means along said first path.

11. The machine for loading bottles into cases as defined in claim 10 including means for reciprocating said bar parallel to said bottle conveyor means.

12. In a bottle loading machine a mechanism for lifting an assembly of free standing bottles comprising, in combination, a finger suspension member; a plurality of bottle gripping fingers pivotably suspended from said finger suspension member about an open space for mutually convergent and divergent movement towards and away from the open space, respectively; a finger locking sleeve mounted about at least a portion of said finger suspension member said plurality of bottle gripping fingers; means for imparting relative movement between said finger suspension member and said finger locking sleeve in a generally vertical direction, and a compression spring mounted between an upwardly facing surface of said locking sleeve and a downwardly facing surface of said finger suspension member.

13. A machine for loading bottles into cases comprising, in combination, bottle conveyor means for continuously conveying upstanding bottles along a first path in one direction through a bottle retrieving station; grouping means for grouping together into a preselected arrangement, a plurality of said upstanding bottles on said bottle conveyor means; case conveyor means spaced from said bottle conveyor means for continually conveying open cases along a second path, in a direction opposite to and offset from said first path and through a case loading station; continuous conveyor means disposed generally between said bottle conveyor means and said case conveyor means, said continuous conveyor means having parallel flights respectively adjacent to and moving in the same direction as said bottle conveyor means and said case conveyor means; and gripper means carried by said continuous conveyor means for being alternately disposed over said bottle conveying means as said gripper means is moved by one of said flights in said one direction and disposed over said case conveying means as said gripper means is moved by the other of said flights in said other direction, said gripper means gripping and carrying a grouped plurality of said upstanding bottles in said bottle retrieving station off of said bottle conveyor means as said gripper means is over said bottle conveyor means and subsequently depositing the gripped group of bottles into an open case as said gripper means passes over the case loading station of said case conveyor means.

14. The machine for loading bottles into cases as defined in claim 13 wherein said continuous conveyor means has an oval path.

15. The machine for loading bottles into cases as defined in claim 13 wherein said continuous conveyor means travels in a horizontal path and means are provided to impart a vertical component to said gripper means so as to lower and then raise said gripper means over said bottle vonveyor means for engaging and removing said bottles and over said case conveyor means to deposit them in a case upon said case conveyor means.

16. The machine for loading bottles into cases defined in claim 13 including a continuous rail forming a continuous track adjacent to said continuous conveyor means, and means on said gripper means for contacting and following the contour of said rail, said gripper means being movable vertically while carried by said conveyor means, increments of said rail being disposed in different vertical planes so as to impart to said gripper means a vertical component toward and away from the surfaces of said bottle conveyor means and said case conveyor means.

17. The machine for loading bottles into cases as defined in claim 13 wherein said bottle conveying means and said case conveying means are parallel to and in a common parallel plane with each other.

18. A machine for loading bottles in accordance with claim 13 comprising an endless track mounted above said continuous conveyor means along which said gripper is continuously driven.

19. A machine for loading bottles in accordance with claim 13 wherein said continuous conveyor means is continuously driven at a uniform velocity.

20. A machine for loading bottles in accordance with claim 19 wherein said moving means are adapted to move said gripped means and lift a plurality of bottles at a substantially uniform velocity over said continuous conveyor means.

* * * * *

UNITED STATES PATENT OFFICE
CERTIFICATE OF CORRECTION

Patent No. 4,055,943                    Dated November 1, 1977

Inventor(s) Donald G. Reichert

It is certified that error appears in the above-identified patent and that said Letters Patent are hereby corrected as shown below:

Column 8, line 27, change "vonveyor" to read --conveyor--.

Signed and Sealed this

Sixteenth Day of May 1978

[SEAL]

Attest:

RUTH C. MASON
Attesting Officer

LUTRELLE F. PARKER
Acting Commissioner of Patents and Trademarks